Figure 1:
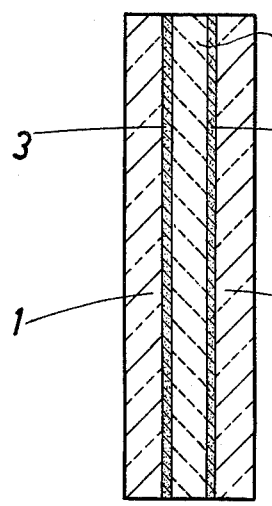

United States Patent [19]
Jacquemin et al.

[11] 3,974,316
[45] Aug. 10, 1976

[54] FIREPROOF GLASSWORK

[75] Inventors: Francis Jacquemin, Monceau-sur-Sambre; Robert Terneu, Montignies-sur-Sambre; Jean-Pierre Voiturier, Gerpinnes, all of Belgium

[73] Assignee: Glaverbel-Mecaniver, Watermael-Boitsfort, Belgium

[22] Filed: Mar. 28, 1974

[21] Appl. No.: 455,717

[30] Foreign Application Priority Data
Sept. 17, 1973 United Kingdom............... 43539/73

[52] U.S. Cl.............................. 428/215; 428/332; 428/426; 428/427; 428/432; 428/437; 428/424; 428/538; 428/539; 428/410; 428/913; 428/920
[51] Int. Cl.² ........................................ B32B 17/06
[58] Field of Search ................ 161/1, 41, 165, 182, 161/190, 191, 192, 196, 199, 215, 225, 257, 403; 428/34, 142, 332, 427, 428, 429, 432, 913, 920; 252/2, 3, 4, 5; 106/15 FP

[56] References Cited
UNITED STATES PATENTS

| | | | |
|---|---|---|---|
| 3,006,783 | 10/1961 | Haaijman et al.................. | 161/192 |
| 3,341,399 | 9/1967 | Hazdra et al. .................... | 161/199 |
| 3,457,138 | 7/1969 | Miller ................................ | 161/196 |
| 3,508,810 | 4/1970 | Baltzer............................... | 161/192 |
| 3,537,944 | 11/1970 | Grubb et al....................... | 161/225 |
| 3,539,442 | 11/1970 | Buckley et al..................... | 161/199 |
| 3,582,455 | 6/1971 | De Lap et al...................... | 161/165 |
| 3,630,809 | 12/1971 | Edwards ........................... | 161/199 |
| 3,640,837 | 2/1972 | Gaeth et al. ...................... | 428/332 |
| 3,793,105 | 2/1974 | Birchall et al. ................... | 161/192 |
| 3,838,091 | 9/1974 | Kanno................................. | 161/1 |

*Primary Examiner*—Harold Ansher
*Assistant Examiner*—William R. Dixon, Jr.
*Attorney, Agent, or Firm*—Cushman, Darby & Cushman

[57] ABSTRACT

The invention relates to a fire screening glazing panel and a method for forming the panel. The panel is composed of at least two structural plys, at least one of which is a vitreous sheet, and a layer therebetween composed at least in part of a heat convertible carrier forming material which material forms a solid porous or cellular thermally insulating body when subjected to sufficient heat, as during a fire. A protective stratum is applied to at least one of the vitreous sheet plys for inhibiting interaction between the barrier forming material and the ply, thereby maintaining the transparency of the ply if it is formed of transparent material, and maintaining its color.

14 Claims, 4 Drawing Figures

U.S. Patent  Aug. 10, 1976  3,974,316

FIREPROOF GLASSWORK

This application is related to our copending applications, Ser. Nos. 455,718 and 455,719, which were filed on the same date as this application.

This invention relates to a fire-screening glazing panel comprising a first structural ply formed by a vitreous sheet and at least one other structural ply.

In the construction of buildings, glazing panels have sometimes had to be used in exterior or interior walls or partitions. An obvious example is the use of light-transmitting glazing panels comprising one or more sheets of glass or vitrocrystalline material to form windows. Another example which is becoming increasingly important lies in the field of opaque glazing panels. Opaque glazing panels are often used, for example, to form the lower part of a partition whose upper part is transparent, especially where it is desired that the surface texture or some other property of the panels forming the upper and lower parts of the partition be similar. Such opaque glazing panels may often be colored.

Structural components sometimes must satisfy stringent standards of fire resistance. Fire resistance is sometimes quantified against a standard test in which the structural component is exposed to a specified temperature cycle over a certain period of time. The fire resistance potential of the component depends on the length of time for which the component can retain the strength required for it to fulfill its function. In certain circumstances fire resistance standards have to be complied with which require the component to have a minimum strength retention time, to be completely flame-proof, and to satisfy certain stringent tests of thermal insulating power to ensure that the component will prevent propagation of fire by heat radiation from the component and will not become so hot as to involve serious risk of burning a person who may touch the panel while it is exposed to the fire.

The standard of fire resistance of a given component can be quantified as a function of the time for which the component satisfies one or more of the specified criteria during a test in which the component is exposed to the interior of an enclosure in which the temperature is raised according to a predetermined schedule.

Ordinary panels comprising one or more sheets of glass are not highly thermally insulating or fire resistant. When exposed to fire, they become very hot so that they cannot be touched without causing personal injury. Moreover, heat radiation from the heated panel itself constitutes a further fire hazard.

Another object of the present invention is to provide a panel incorporating one or more vitreous sheets, which glazing panel is able to withstand the effects of fire and whose vitreous sheet or sheets retain their given properties over the course of time under normal circumstances, i.e., in the absence of fire.

Accordingly, the present invention provides a fire-screening glazing panel comprising a first structural ply formed by a vitreous sheet and at least one other structural ply, characterized in that there is provided between said plies at least one layer composed of or incorporating a material which when sufficiently heated becomes converted to form a thermally insulating barrier or barriers, and a protective stratum located between said first structural ply and a said heat convertible layer, such protective stratum being composed so as to inhibit interaction between said barrier forming material and said first ply.

The expression "vitreous material" as used herein comprises glass and vitrocrystalline material. Vitrocrystalline material is formed by subjecting a glass to a thermal treatment so as to induce the formation of one or more crystalline phases therein.

The invention affords a number of advantages which are considered to be important.

A first advantage is that the fire screening panel is very easy to install and is in itself sufficient to prevent or to delay the propagation of fire across an opening closed by the panel.

It has been found that under certain circumstances vitreous sheets may suffer deterioration by prolonged contact with various barrier forming materials, and in particular, that the vitreous sheets may suffer a loss of transparency or undergo a change in color, and a second advantage of the present invention resides in the fact that such interaction may be substantially eliminated, even during prolonged use.

In particular, the panel may be made transparent and remain so until the barrier forming material is converted to form the thermally insulating barrier(s).

At least one layer of barrier forming material is preferably convertible by heat to form a barrier which is of greatly reduced infrared radiation transmitting power, or which is opaque. This feature allows the formation of very effective fire screens since the intensity of any infrared radiation from a fire on one side of the panel which is transmitted through the panel may be reduced to a level at which it cannot, of itself, start a secondary fire on the other side of the panel.

The invention is equally applicable to opaque panels and to light transmitting panels.

Preferably however, said panel is a light-transmitting panel, so that it may be used, for example, as an observation window until the advent of fire.

Advantageously, said barrier forming material is convertible by heat to form a solid porous or cellular body, since such bodies generally have low thermal conductivity.

Preferably, said barrier forming material comprises an hydrated metal salt.

Examples of metal salts which can be used in hydrated form are as follows:

| | | |
|---|---|---|
| Aluminates, | e.g. | sodium or potassium aluminate |
| Plumbates, | e.g. | sodium or potassium plumbate |
| Stannates, | e.g. | sodium or potassium stannate |
| Alums, | e.g. | sodium aluminum sulphate or potassium aluminum sulphate |
| Borates, | e.g. | sodium borate |
| Phosphates, | e.g. | sodium orthophosphates, potassium orthophosphates and aluminum phosphate |

Hydrated alkali metal silicates, e.g. sodium silicate, are also suitable for use in a said heat-convertible layer.

Such substances have very good properties for the purpose in view. They are in many cases capable of forming transparent layers which adhere well to a protective stratum. On being sufficiently heated, the combined water boils and the layer(s) foams, so that the hydrated metal salt is converted into an opaque solid porous or cellular form in which it is highly thermally insulating and remains adherent to the protective stratum.

This feature is particularly important, since even if all the structural plies of the panel are cracked or broken by thermal shock, the panel may retain its effectiveness as a barrier against heat and fumes since the fragments of the plies may remain in position bonded together by the converted metal salt.

It will be appreciated that given certain requirements for a fire screening glazing panel, though all the above compounds are suitable, each has its particular advantages and disadvantages. For example, sodium silicate is one of the cheapest, and is able to withstand higher temperatures for brief periods such as may be encountered during the manufacturing process than are many of the other salts given above. Sodium silicate can also be formed into transparent layers quite easily. However, hydrated sodium silicate is one of the most active of the above salts as regards its deleterious affect on an adjacent vitreous sheet. Alums on the other hand are slightly more expensive and are not able to withstand such high temperatures as hydrated sodium silicate without decomposing, and they are more difficult to form into transparent layers. But alums have only a very slight deleterious affect on glass sheets with which they are in contact, and under normal circumstances, this affect is only noticeable after prolonged periods. Nonetheless, this slight deleterious affect would be present were it not for the present invention.

If a panel according to the invention and incorporating such hydrated metal salt sandwiched layers is exposed to fire, the water in the salt layer is first boiled off. During boiling off of the combined water of the sandwiched layer, its temperature remains substantially constant, and excessive heating of the structural ply remote from the fire is delayed. As the combined water becomes completely removed from the sandwiched layer, this layer becomes very effective as a thermal barrier.

In some embodiments, a layer of hydrated metal salt is used which is merely translucent, but preferably the hydrated metal salt forms a transparent solid layer at ambient temperature. Sodium silicate, sodium aluminum sulphate and aluminum phosphate can form transparent layers.

If the other structural ply is also a vitreous sheet, a protective stratum is preferably likewise provided between that other vitreous sheet and the adjacent layer of barrier-forming material.

This feature is equally applicable in cases where the panel is a true laminate, i.e. a multi-ply panel whose plies are bonded together face to face, and where it is a multi-ply panel whose plies are held clamped together by extraneous means, such as a frame.

In some preferred embodiments, the protective stratum comprises a sheet of substantially water-impervious plastic material. Polyvinyl butyral is an especially suitable material for forming a plastic protective stratum, which may for example be 0.76 mm thick, though any other film-forming plastic material having the requisite properties may be used. In some embodiments of the invention the plastic protective stratum comprises a plastic material which has been polymerized in situ, such as polyurethane.

In other preferred embodiments of the invention there is at least one protective stratum which comprises a coating applied to the vitreous sheet face to be protected. Such a coating preferably comprises an anhydrous metal compound deposited onto the sheet, since such coatings can form very effective protective strata.

Clearly, one criterion affecting choice of a suitable coating material will be the composition of the thermally insulating barrier forming layer. By way of example, when the barrier forming material is of alkali metal silicates, borax, or an alum of potassum or sodium, then the coating material preferably comprises zirconium oxide or anhydrous aluminum phosphate. When the thermally insulating barrier forming layer is of hydrated aluminum phosphate, then titanium oxide, zirconium oxide, tin oxide and anhydrous aluminum phosphate are eminently suitable protective coating materials. It is, perhaps, surprising to note that a protective stratum of anhydrous aluminum phosphate when deposited onto a vitreous sheet will serve substantially to prevent interaction between that vitreous sheet and an adjacent layer of hydrated aluminum phosphate. This invention does not exclude the use of other coating materials.

Preferably the protective stratum when constituted by a coating as aforesaid is between 100 and 1,000 Angstrom units thick, so as to provide a non-porous coating without giving rise to unsightly interference effects.

Preferably, at least one said layer of barrier forming material is between 0.1 mm and 8 mm in thickness. Layers having this range of thickness can be converted to become very effective fire-screening barriers. It is clear that the effectiveness of a fire-screening barrier formed from a layer of given material will depend on its thickness, however, the transparency of such a layer will be lessened with increased thickness. Preferably at least one layer of heat-convertible material has a thickness of between 0.1 mm and 3 mm. In embodiments of the invention comprising two or more such heat convertible layers at least one layer preferably has a thickness of between 0.1 mm and 0.5 mm.

Preferably the first structural ply — and the other plies that are vitreous sheets — of the panel are tempered. A tempered vitreous sheet is better able to withstand thermal shocks. Chemically tempered sheets are particularly recommended.

A panel according to the invention preferably comprises two structural plies, each constituted by a vitreous sheet and each providing an external face of the panel. Such a panel structure has the merit of simplicity. It is to be understood however that it is within the scope of the invention for the panel to incorporate more than two structural plies. The invention also includes panels where a layer of thermal barrier-forming material is present in each of the two or more inter-ply spaces.

According to preferred embodiments of the invention, the panel is in the form of a laminate, i.e. a multi-ply panel structure in which the first vitreous sheet, at least one other structural ply, and the heat convertible layer(s) between such plies are bonded together in face to face relation.

The invention however also includes multi-ply panels in which the first ply, another structural ply, and a heat convertible layer intervening between such plies, are held together by extraneous means, e.g., by means of a frame.

The invention also includes an article which comprises a multi-ply panel according to the invention as hereinbefore defined together with a second panel (comprising a single sheet or a plurality of sheets) held in spaced relationship to said multi-ply panel. Thus the invention can be embodied in a hollow glazing unit.

As mentioned above, embodiments of the invention in which the panel is in the form of a laminate are especially useful. The invention includes a method of forming such a laminate, which method comprises the steps of applying to one side of a first structural ply constituted by a vitreous sheet a protective stratum and a layer composed of or incorporating a material which when sufficiently heated is converted to form a thermally insulating barrier, and applying and bonding such a layer to another ply of the panel, the protective stratum comprising a material selected so as to inhibit interaction between such barrier forming material and the first ply. This is a very simple and effective way of forming a laminate type panel according to the invention.

Preferably, the single or at least one of a plurality of said heat convertible layers is formed of an hydrated metal salt, and preferably such hydrated metal salt is selected from the following group: aluminates, plumbates, stannates, alums, borates, phosphates and alkali metal silicates. The advantages conferred by these method features are readily discernable from the corresponding advantageous features of the panel according to the teachings of the present invention.

Advantageously, the hydrated metal salt layer is applied as an aqueous solution which is dried before assembly of the panel. For example, in order to obtain a layer of hydrated aluminum phosphate, an aqueous solution containing 3.5 moles/liter of the salt is applied to a sheet, and subsequently dried by using a fan. This solution may be obtained by mixing solutions of phosphoric acid and aluminum chloride in stoichiometric proportions. This is a very simple way of obtaining a required layer of barrier forming material.

Preferably a protective stratum is formed on each vitreous sheet face of the panel onto which a layer of barrier forming material is subsequently applied. Preferably the single or one of a plurality of said protective stratum is formed as a sheet of substantially water impervious plastic material, and advantageously such plastic protective stratum is formed of polyvinyl butyral. In the preferred embodiments of the method according to the teachings of the present invention a protective stratum is applied to a vitreous sheet face as a coating. Advantageously such a protective stratum is formed by depositing a coating of an anhydrous metal compound onto a vitreous sheet face. The advantages of these preferred features of the method according to the teachings of the present invention will also be appreciated from the advantages recited in respect of corresponding preferred features of the panel according to the invention.

Such deposition of an anhydrous metal compound coating to serve as a protective stratum is preferably performed by pyrolysis or hydrolysis, since these are very convenient ways of forming a uniform coating which is highly resistant to the deleterious affects of a barrier forming material.

Preferably, the barrier forming material is selected from the group: alums, borates, and alkali metal silicates, and an anhydrous metal compound for forming a protective stratum is selected from zironcium oxide and anhydrous aluminum phosphate, but in alternative preferred embodiments, the barrier forming material comprises hydrated aluminum phosphate and an anhydrous metal compound for forming a protective stratum is selected from the group: titanium oxide, zirconium oxide, tin oxide and anhydrous aluminum phosphate.

Advantageously, such a protective coating is formed to a thickness of between 100 and 1000 Angstrom units. Preferably, the single or at least one of the plurality of the heat-convertible layers is formed to a thickness of between 0.1 mm and 8 mm, and for optimum transparency, the single or at least one of a plurality of the heat convertible layers is formed to a thickness of between 0.1 mm and 3 mm. Where two or more of said heat convertible layers are incorporated into the panel, it is preferred that the thickness of at least one of said heat convertible layers should be between 0.1 mm and 0.5 mm.

In some preferred embodiments of the method according to the teachings of the present invention, a vitreous structural ply and a heat convertible layer are assembled on opposite sides of a stratum of plastic forming material comprising an organic monomer, and the assembly is subjected to heat and pressure to polymerize the monomer in situ and bond the ply and heat-convertible layer together on opposite sides of the plastic protective stratum thus formed. Embodiments having this feature have the advantage that the polymerization temperature may be kept below 80°C by suitable choice of organic monomer, and this obviates risk of premature conversion of the heat convertible layer during the bonding process.

Urethane is a very suitable organic monomer for incorporating in such a stratum, and can be polymerized in situ to form a protective stratum of polyurethane.

Panels according to the invention may be used to form or to form parts of fireproof doors or partitions in buildings, and for various other purposes.

The present invention will now be further described by way of example with reference to the accompanying diagrammatic drawings in which FIGS. 1 to 4 are cross-sectional views of various embodiments of fire screening glazing panel.

EXAMPLE 1

A fire screening glazing panel as shown in FIG. 1 was made which comprised two sheets 1, 2 of soda-lime glass each 4 mm thick and each bearing on one face a protective stratum 3 of anhydrous aluminum phosphate 500 Angstrom units thick. A heat convertible layer 4 of hydrated sodium silicate 4 mm thick was sandwiched between the protective strata 3. The panel was transparent.

The protective strata 3 of anhydrous aluminum phosphate were deposited onto the glass sheets by the following method: A solution in alcohol containing one mole of anhydrous aluminum trichloride and one mole of anhydrous phosphoric acid was prepared. Because of the reaction between the aluminum trichloride and phosphoric acid, a solution of one mole of anhydrous aluminum phosphate was formed. This solution was applied to the upper faces of the sheets of glass which had previously been laid horizontally, and allowed to spread out to cover the whole area of the sheet faces, and then dried. The treated sheets were placed in a furnace heated to 400°C, and when removed, the sheets were found to have an anhydrous aluminum phosphate protective stratum strongly adherent to one face. The sheets were then cooled and one of them was laid horizontally with its protected face upward. A 4 mm thick layer of hydrated sodium silicate was then laid onto that protected face of the glass sheet. The sodium silicate was applied as an aqueous solution having the following properties:

| Proportion by weight | $\frac{SiO_2}{Na_2O} = 3.4$ |
|---|---|
| Viscosity | 200 centipoises |
| Density | 37° to 40° Baumé |

This layer was dried for 12 hours at 30°C in an atmosphere having a relative humidity of 35%.

The face of the other sheet of glass bearing a protective stratum of anhydrous aluminum phosphate was then applied to the heat convertible layer thus formed in order to obtain the glazing panel shown in FIG. 1.

When such a fire screening glazing panel is exposed to fire, the heat convertible layer, in this case of hydrated sodium silicate, is dehydrated and becomes opaque. The layer also thickens and gives rise to a porous body which forms an efficacious barrier against fire. During the course of this conversion by heat, the bound water is driven off, and this helps to limit the increase in the temperature of the panel.

When comparing a panel according to the present Example with another panel which lacks the protective strata but is otherwise similar, it is found that the panel not formed according to the teachings of the present invention will deteriorate during the course of time. In particular, even in the absence of fire, a panel without a protective stratum tends to become opaque. A panel according to the present Example on the other hand does not appreciably deteriorate in this way, even during prolonged periods, and can remain as transparent as when it was made. It is the presence of protective strata, in this case of anhydrous aluminum phosphate, between the heat convertible layer, here of hydrated sodium silicate, and the adjacent glass sheets which enables the panel to maintain its transparency.

As a variation, a panel of similar construction was made using vitrocrystalline sheets 1, 2 in place of the glass sheets, and incorporating a hydrated potassium silicate layer in place of that of hydrated sodium silicate. Again, anhydrous aluminum phosphate protective strata were used. It was found that this variant panel had substantially the same properties and the same advantages as the panel described above.

In another variation, the glass sheets 1, 2 of the panel first described were subjected to a chemical tempering treatment before the protective strata were applied. This tempering treatment was a process involving the exchange of sodium ions from surface layers of the glass for potassium ions from a bath of molten potassium nitrate maintained at 470°C. This panel had the same advantages as the others described above, and in addition had a greater resistance to breakage due to thermal shock during the build up of a fire than did the others.

EXAMPLE 2

A fire screening glazing panel as shown in FIG. 1 was made, which panel comprised two sheets 1, 2 of 4 mm thick soda-lime glass each having on one face a protective stratum 3 of titanium oxide, and, sandwiched between the protective strata of the sheets of heat convertible layer 4 of hydrated aluminum phosphate which is convertible to form a fire screening barrier.

The protective strata 3 were each 400 Angstrom units thick and were applied by the well known vacuum evaporation technique.

The layer 4 of hydrated aluminum phosphate which was 0.5 mm thick was obtained by applying an aqueous solution containing 3.5 moles/liter of hydrated aluminum phosphate onto the protected face of the first sheet 1, and subsequently drying the solution by blowing warm air across the sheet. This can be done using a fan. The solution was obtained by mixing phosphoric acid and aluminum chloride in stoichiometric proportions.

The face of the other glass sheet 2 protected by a protective stratum 3 of titanium oxide was then assembled to the heat convertible layer thus formed to complete the panel.

It has been found that a panel according to this Example maintains its transparency well, and that the heat convertible layer 4 acts as an extremely efficient fire screening barrier when converted on the advent of fire.

As a variation, an otherwise similar panel was constructed in which the titanium oxide protective strata were replaced by anhydrous aluminum phosphate protective strata formed by the method described in Example 1. It is perhaps surprising to note that the protective strata of anhydrous aluminum phosphate serve substantially to prevent interaction between the layer of hydrated aluminum phosphate and the glass sheets, even during prolonged periods. The fire resistance properties of this variant panel were the same as those of the panel first described in this Example.

EXAMPLE 3

Figure 2:
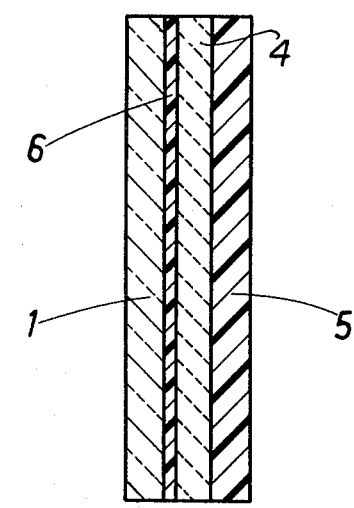

A fire screening glazing panel as shown in FIG. 2 was made which comprised a plastic structural ply 5 onto which had been deposited a heat convertible layer 4 which was then applied and bonded to a glass sheet 1 via an intervening protective stratum 6 of polyurethane. In this Example, no special coating treatment was applied to the glass sheet 1, and this sheet was instead protected by the polyurethane stratum 6. The glass sheet 1 was of soda-lime glass 6 mm thick, and the plastic structural ply 5 was constituted by a sheet of polyvinyl chloride 6 mm thick which was colored red.

The panel was formed by applying a saturated aqueous solution of sodium aluminum sulphate onto the upper surface of the polyvinyl chloride sheet 5 which had been laid horizontal, and then heating the sheet to 30°C to drive off the water of solution to leave a heat convertible layer 8 mm thick of hydrated sodium aluminum sulphate. A stratum of polyurethane prepolymer (urethane) was applied to one face of the glass sheet, and the heat convertible layer in the plastic sheet was then applied to the same face of the glass sheet. The temperature of the assembly was then raised to polymerize the stratum 6 and a pressure of 15 kg/cm² was applied to bond the plies of the panel securely together.

A panel has also been manufactured similar to that described above except that the protective stratum 6 was formed of polyvinyl butyral, and that the barrier forming material used in the layer 4 was hydrated potassium aluminum sulphate.

These panels have good fire resistance properties, particularly in the case where a fire breaks out on the glass sheet side of the panel, and also have the advantage that their aesthetic qualities are maintained since interaction between the glass sheet and the alum is substantially prevented by the plastic protective stratum 6.

In another variation of the panel shown in FIG. 2, the protective stratum 6 was of polyvinyl butyral, the heat convertible layer 4 was of hydrated sodium silicate formed as described in Example 1, and the sheet 5 was of glass and identical with the first sheet 1. This panel also gave good fire resistance, and even though the second glass sheet 5 was not protected from the barrier forming material, the degree of optical deterioration to which the panel as a whole was subjected was substantially less than that of previously known panels because of the protection afforded to the first glass sheet 1 by the protective stratum 6.

EXAMPLE 4

Figure 3:
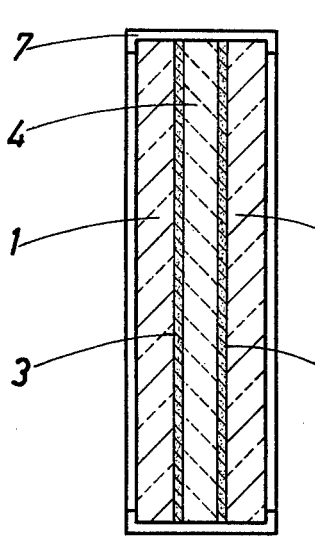

A panel was formed as shown in FIG. 3. This panel comprised two sheets 1, 2 of soda-lime glass 4 mm thick, each bearing a protective coating 3 of zirconium oxide. A heat convertible layer 4 of hydrated aluminum phosphate was located between the coated faces of the glass sheets, and the plies of the panel were held assembled in contact by means of a frame 7.

In order to make the panel, one face of each glass sheet was given a protective coating 400 Angstrom units thick of zirconium oxide by pyrolysis, and a 1 mm thick heat convertible layer of hydrated aluminum phosphate was applied to one of the sheet faces thus protected by the method described in Example 2. The protected face of the other sheet was then brought into contact with the heat convertible layer, and a frame was fixed around the edges of the panel in order to hold it assembled.

The zirconium oxide protective coatings 3 were deposited as follows. A solution was prepared comprising denatured ethyl alcohol containing 150g/liter of zirconium tetrachloride. 10% by volume of acetylacetone was added, and the solution was sprayed through atomizing nozzles onto glass sheets which were heated to 600°C.

It was found that the glazing panel obtained had good fire resistance, and also that its transparency was maintained over extended periods.

As a variation, a similar panel was constructed in which the zirconium oxide protective strata were replaced by 400A thick strata of tin oxide ($SnO_2$). The tin oxide coatings were applied by the well known hydrolysis process. This panel had the same advantages as that described immediately above.

In a second variation, tin oxide protective coatings were again used, but in this case they were doped with antimony, the antimony atoms numbering 1.5% of the tin atoms. In addition to the advantages described above, these coatings gave the panel a high degree of infrared radiation reflection. This is very advantageous since it tends to slow down heating of the panel, and also allows some measure of fire protection while the panel is still transparent, i.e. before conversion of the layer of barrier forming material.

In a third variation, indium oxide protective coatings were used, which coatings were doped with tin. This is also very advantageous since this also tends to slow down heating of the panel and also allows some measure of fire protection while the panel is still transparent, i.e. before conversion of the layer of barrier forming material.

In a fourth variation, two sheets 1, 2 of soda-lime glass 6 mm thick were each coated on one face with a protective stratum 3 of anhydrous aluminum phosphate 500A thick by the method directed in Example 1 and were then sealed in spaced relation in a frame 7. The space between the sheets, which was 8 mm across, was then filled with a solution of hydrated sodium silicate to form a heat convertible layer 4. This solution was as described in Example 1. This glazing panel had the same advantages of good fire resistance and maintenance of its optical properties as those described above.

EXAMPLE 5

A fire screening glazing panel was made as described in Example 1 with reference to FIG. 1, except that the protective strata 3 were of zirconium oxide, and the heat convertible layer 4 was of sodium aluminum sulphate. The protective strata 3 were applied as described in Example 4, and the heat convertible layer 4 as described in Example 3, and the strata and layer had the thicknesses given in those respective Examples.

As a variation, the zirconium oxide protective strata 3 were replaced by strata of anhydrous aluminum phosphate applied as described in Example 1.

The advantages of these panels were similar to those previously cited.

EXAMPLE 6

Fire screening glazing panels were constructed as described in Example 5 with reference to FIG. 1, except that the heat convertible layer 4 was in each case a layer of potassium aluminum sulphate 0.5 mm thick. These layers were applied as described in Example 3.

As a variation, panels were made in which the 0.5 mm layers of potassium aluminum sulphate were replaced by 1 mm layers of hydrated sodium borate. A layer of sodium borate may be applied to a glass sheet in the following manner: The sheet is laid horizontaly with its protected face upward, and a saturated solution of sodium borate is poured onto and allowed to spread over the upper surface of the sheet to a suitable thickness. The sheet is then heated to 30°C to dry the solution and leave a solid layer of hydrated sodium borate.

The advantages afforded by these panels are similar to those described above.

EXAMPLE 7

Various fire screening glazing panels were constructed as described in Example 1 with reference to FIG. 1, except that in each case, the protective strata 3 used were of zirconium oxide instead of anhydrous aluminum phosphate. The zirconium oxide protective strata used were deposited to a thickness of 400A by the method described in Example 4.

The advantages afforded by these panels were similar to those of the panels of Example 1.

EXAMPLE 8

Various fire screening glazing panels were constructed as described in Example 3 with reference to FIG. 2, except that in each case, an alternative barrier forming material was used in the heat convertible layer 4, and the protective stratum 6 was formed of acrylic resin 100 microns thick.

The various barrier forming materials used were sodium aluminate, potassium aluminate, sodium plumbate, potassium plumbate, sodium stannate, potassium stannate, sodium phosphate and potassium phosphate, all in hydrated form.

An acrylic resin protective stratum can be formed by applying to one face of a vitreous sheet a prepolymerized liquid obtained by copolymerization of acrylic acid and methylacrylate and containing 5% by weight of methacryloxypropyltrimethoxysilane in order to increase its adherence to the vitreous material. Such a treated sheet can be heated to 60°C, before or after the application of barrier forming material, in order to obtain a protective stratum of acrylic resin.

These glazing panels had similar properties to those of Example 3.

EXAMPLE 9

Figure 4:
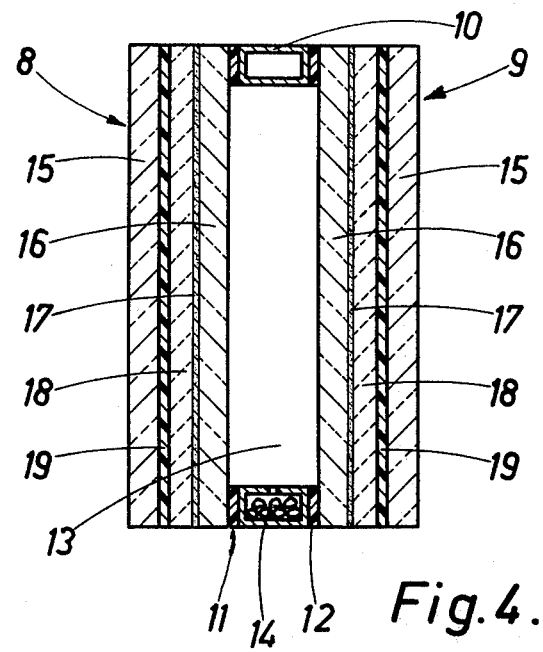

A glazing panel as shown in FIG. 4 was made comprising two multi-ply elements 8, 9 held in spaced relationship by an intervening spacer member 10 of hollow or channel cross section. The spacer member 10 was glued to a ply of each of the elements 8, 9 using thiokol 11, 12. The internal space 13 of the hollow panel thus formed was air-filled, and the air was kept dry with the aid of desiccating material 14 such as silica gel contained in the spacer member 10 along the lower edge of the panel.

The multi-ply elements 8, 9 were identical, and each comprised two sheets 15, 16 of soda-lime glass 3 mm. thick. A glass sheet 16 of each element was given a protective stratum 17 of anhydrous aluminum phosphate 500A thick onto which was applied a 2.5 mm heat convertible layer 18 of hydrated sodium silicate and this layer was bonded to the other glass sheet 15 using a protective bonding stratum 19 of polyvinyl butyral 0.76 mm. thick.

The protective strata 17 of anhydrous aluminum phosphate and the layer 18 of hydrated sodium silicate were applied to each glass sheet 16 by the method described in Example 1.

The bonding process takes place in two stages. In the first stage, the assembly is placed in a chamber which is then partially evacuated in order to remove any air trapped between the plies of the assembly. The temperature is raised to 80°C, still under low pressure to effect "prebonding" of the assembly.

Then, in the bonding stage, the pressure is increased to 15 kg/cm$^2$ and the temperature to 130°C, in order firmly to bond the assembly together.

A hollow double glazing panel constructed in accordance with the present invention has excellent fire resisting properties, and can be positioned in a frame in an opening very easily. The panel does not need any auxiliary installations, such as sprinklers, in order to achieve this.

In the case where the panel is exposed to fire it has been found that it kept its thermal insulation during 40 minutes, while it kept its mechanical stability and its flameproof properties during 45 minutes when the panel is used as a wall furnace in which temperature is progressively increased from room temperature to 925°C over a period of 1 hour.

Furthermore, under normal conditions, that is in the absence of fire, the panel maintains its high transparency because direct contact between the glass sheets and the barrier forming material is prevented.

It is apparent that one or both of the elements 8, 9 may be replaced by a panel as described in any preceding Example, and indeed that one of such multi-ply elements on its own will afford good fire resistance.

Although the invention has been herein shown and described in what is conceived to be the most practical and preferred embodiments, it is recognized that departures may be made therefrom within the scope of the invention which is not to be limited to details disclosed but is to be accorded the full scope of the claims so as to embrace any and all equivalent structures and methods.

What is claimed is:

1. A fire screening glazing panel comprising a first structural ply formed by a vitreous sheet, a second structural ply formed by a vitreous or plastic sheet, a layer formed between said plies comprising a material which is convertible to form a thermally insulating barrier or porous or cellular structure when said panel is subjected to sufficient, heat, such as when said panel is subjected to a fire, said material being an hydrated salt selected from the group consisting of aluminates, plumbates, stannates, alums, borates, alkali metal silicates and phosphates, and protective stratum means located between said first structural ply and said layer of heat convertible barrier forming material for inhibiting interaction between said barrier forming heat convertible material and said structural ply, wherein said protective stratum means is selected from the group consisting of layers of polyvinylbutyal and polyurethane substantially water imprevious plastic sheets and coatings of anhydrous metal oxides and anhydrous aluminum phosphate.

2. A panel as recited in claim 1 wherein said panel is light-transmitting.

3. A panel as recited in claim 1 wherein said protective stratum means is provided between each vitreous structural ply of said panel and every adjacent layer of barrier forming material.

4. A panel as recited in claim 1 wherein said protective stratum means comprises a coating applied to the vitreous sheet face to be protected.

5. A panel as recited in claim 4 wherein said protective stratum means comprises a coating of an anhydrous metal compound, selected from the group consisting of anhydrous metal oxides and anhydrous aluminum phosphate, deposited onto said sheet face.

6. A panel as recited in claim 5 wherein said barrier forming material is selected from the group consisting of alums, borates, and alkali metal silicates, and wherein said anhydrous metal compound deposited onto said sheet face is selected from the group consisting of zirconium oxide and anhydrous aluminum phosphate.

7. A panel as recited in claim 5 wherein said barrier forming material comprises hydrated aluminum phosphate, and wherein said anhydrous metal compound deposited onto said sheet face is selected from the group consisting of titanium oxide, zirconium oxide, tin oxide, and anhydrous aluminum phosphate.

8. A panel as recited in claim 4 wherein said protective stratum means coating is between 100 and 1000 Angstrom units thick.

9. A panel as recited in claim 1 wherein said barrier forming material layer is between 0.1 and 8 mm in thickness.

10. A panel as recited in claim 9 wherein said barrier forming material layer is between 0.1 and 3 mm in thickness.

11. A panel as recited in claim 1 wherein at least one vitreous sheet structural ply of said panel has been tempered.

12. A panel as recited in claim 1 wherein said protective stratum means comprises a layer formed of a sheet of substantially water impervious plastic material selected from the group consisting of polyvinylbutyral and polyurethane.

13. A panel as recited in claim 1 wherein said panel comprises two vitreous sheet structural plies each providing an external face of said panel.

14. A panel as recited in claim 1 wherein said panel is a laminate whose various plies are bonded together in face-to-face relation.

* * * * *